R. H. WHITE.
AUTOMOBILE BRAKE.
APPLICATION FILED OCT. 9, 1908.
1,063,485.
Patented June 3, 1913.
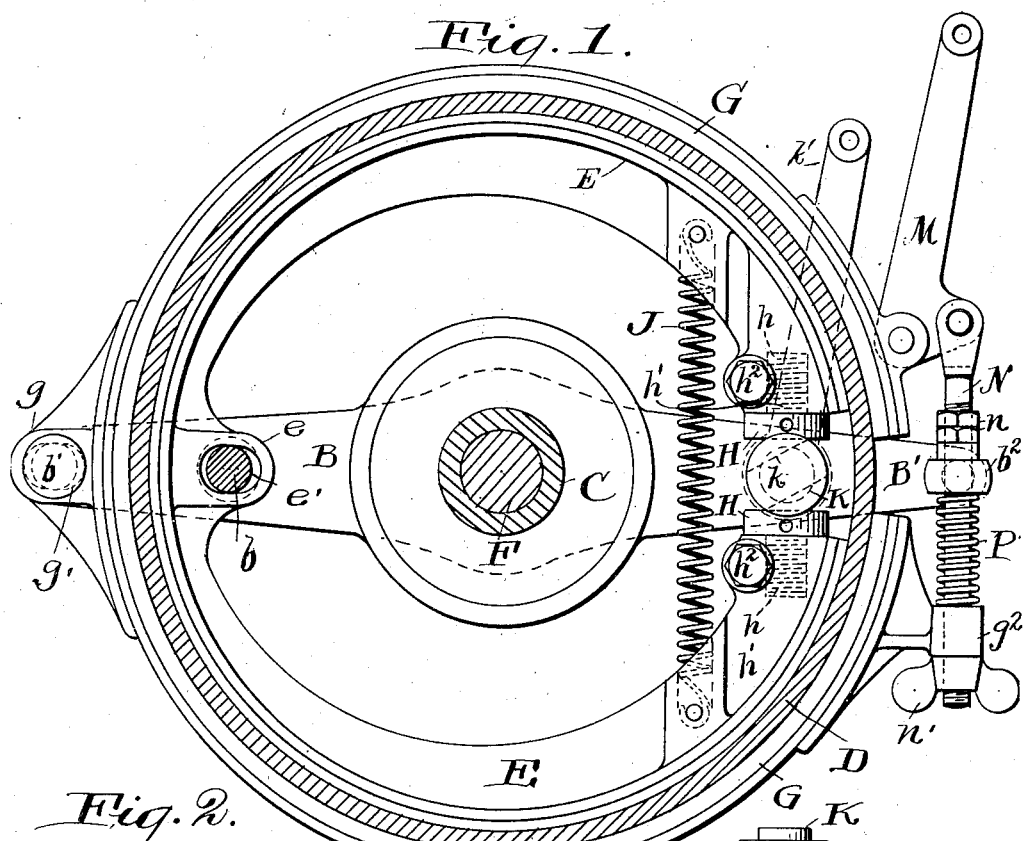
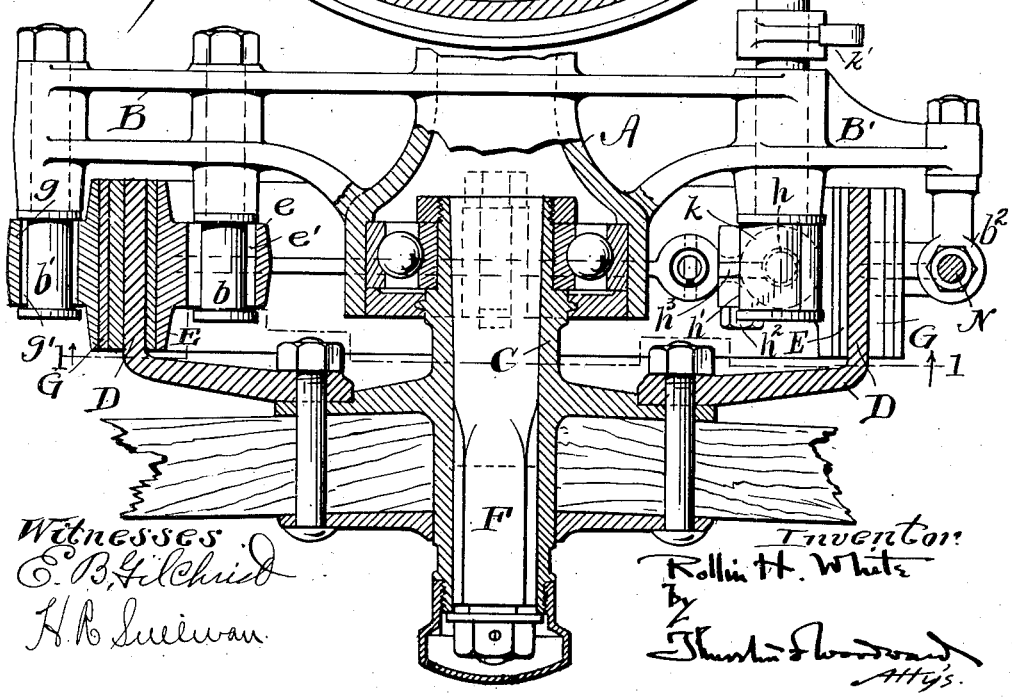

UNITED STATES PATENT OFFICE.

ROLLIN H. WHITE, OF CLEVELAND, OHIO, ASSIGNOR TO THE WHITE COMPANY, OF CLEVELAND, OHIO, A CORPORATION OF OHIO.

AUTOMOBILE-BRAKE.

1,063,485.  Specification of Letters Patent.  Patented June 3, 1913.

Application filed October 9, 1908. Serial No. 456,856.

*To all whom it may concern:*

Be it known that I, ROLLIN H. WHITE, a citizen of the United States, residing at Cleveland, in the county of Cuyahoga and State of Ohio, have invented a certain new and useful Improvement in Automobile-Brakes, of which the following is a full, clear, and exact description.

The object of this invention is to provide an efficient brake for the driving wheels of a motor car.

The invention consists in the combinations of parts hereinafter described and definitely pointed out in the claim.

In the drawing, Figure 1 is a sectional end view of the invention in the plane indicated by line 1—1 on Fig. 2, and Fig. 2 is a central horizontal section of the invention.

Referring to the parts by letters A represents a non-rotative part having rigid with it two arms B, B' which extend horizontally in opposite directions. The part A is intended to be secured to or formed on the outer end of what is sometimes known as the "dead axle"—that is to say, the laterally extending tubular members of the casing which incloses the differential mechanism of a motor car.

C represents the hub of one of the driving wheels, which hub is rotatively mounted upon suitable anti-friction bearings in the outer end of the fixed member A. An annular brake flange D is rigidly fixed to the wheel hub. The wheel hub itself is rigidly fixed to the live axle F by any suitable means which will compel them to rotate in unison.

E represents an inner brake ring which is, like all such brake rings, split through one side. At a point midway between the split in this ring an inwardly projecting boss $e$ is formed on it in which is a horizontal slot $e'$. A flanged bearing stud $b$, fixed to the arm B, passes through this slot and supports the brake ring against rotation, but, obviously, permits a horizontal movement of the ring. Projecting flanges at the ends of the bearing portion of stud pin $b$ embrace the sides of boss $e$ and prevent lateral displacement of brake ring E. Adjustable bearing plates H are secured to the separated ends of this brake ring,—these plates being the heads of screws $h$ which screw into said ends, and lie, when once screwed in, with their faces horizontal and parallel with each other. The screws $h$ take into lugs $h'$ on the ends of the brake band, the lugs being split at one side of the screw sockets as at $h^3$ and provided with screws $h^2$ across said split to draw their edges together and securely clamp the screws $h$ from turning away from adjusted position. A rock shaft K bearing an operating lever $k'$ is mounted in the arm B' and has between the plates H, H, a cam $k$ which, when the rock shaft is rocked in one direction, will, by bearing against the plates H, H, thrust the ends of the ring apart and so cause the entire ring to press against the inner periphery of the cylindrical flange D, the slot $e'$ permitting the necessary horizontal movement of said ring to permit the entire engagement as specified. Projecting flanges at the ends of cam $k$ embrace the screw heads or bearing plates H, H between them and prevent lateral displacement of the ends of brake ring. A contractile coil spring J is stretched between and connected with opposite arms of the split ring, and this spring exerts its force to draw the arms of the ring out of engagement with flange D when the cam $k$ has been turned to permit this action.

It will be noted that in the foregoing construction the horizontal slot $e'$, in the brake ring permits it to move as required to free the adjacent parts of said ring from contact with the flange D, or to permit it to come into contact therewith. The adjustable plates H furnish means for adjusting the brake ring E to compensate for wear.

Having thus described my invention, I claim:

The combination of a rotatable wheel having an annular brake flange, a non-rotatable member adjacent thereto and having a bearing stud mounted thereon, a floating inner split brake band having on the side opposite the split a slotted boss which engages said stud, flanges at the ends of the bearing portion of the stud which embrace the sides of the boss, a rock shaft mounted on a fixture and having a cam which lies between and acts upon the ends of the brake band, and having flanges at its ends which embrace the sides of the band ends, whereby the flanges on the bearing stud and on the cam hold the floating ring against lateral displacement.

In testimony whereof, I hereunto affix my signature in the presence of two witnesses.

ROLLIN H. WHITE.

Witnesses:
H. R. SULLIVAN,
E. L. THURSTON.